Aug. 27, 1940.　　　　E. E. HOFFMAN　　　　2,213,026
GAUGE FOR BLENDING PAINTS, LACQUERS, ETC
Filed Dec. 7, 1939　　　2 Sheets-Sheet 1
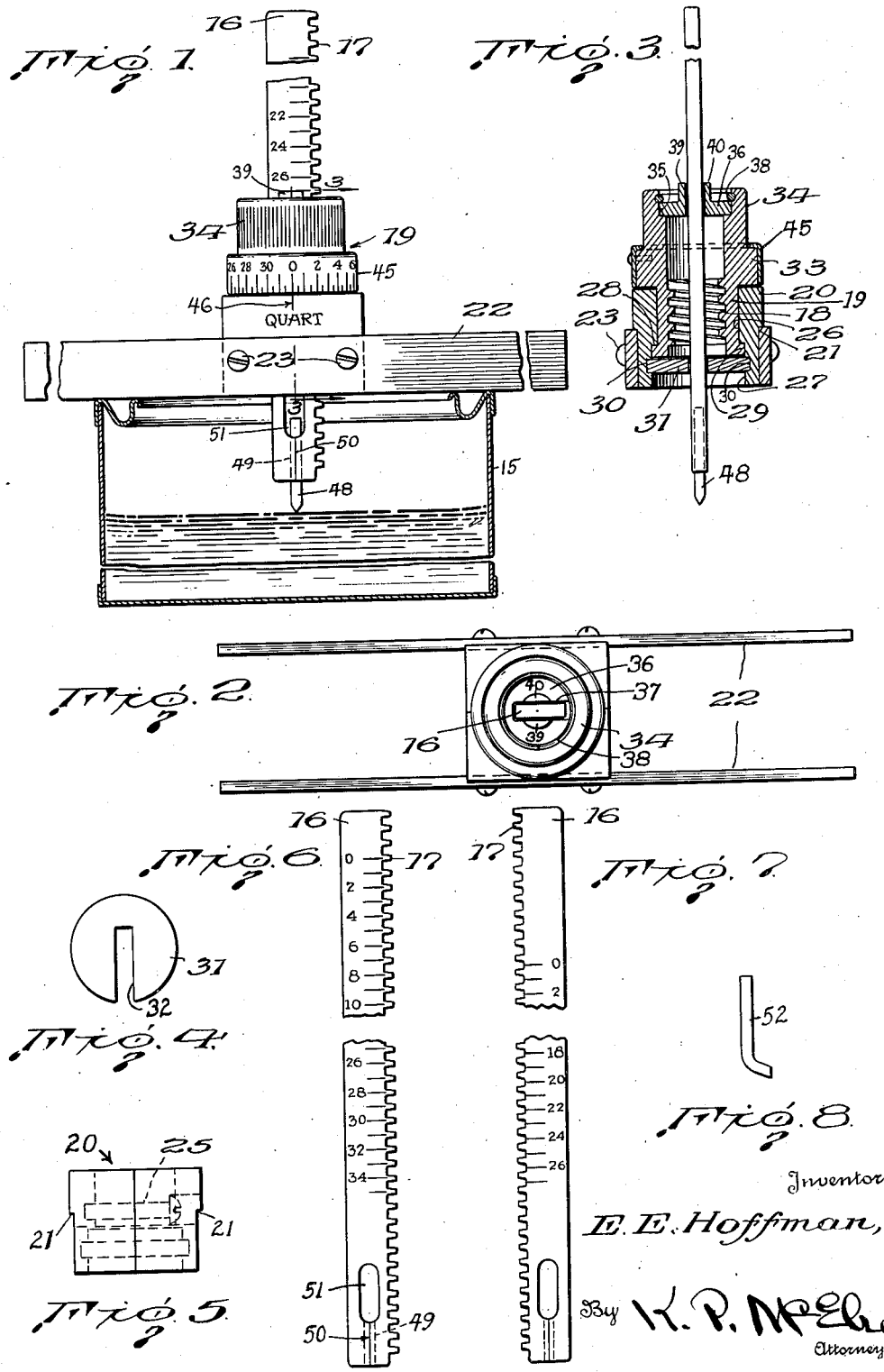

Aug. 27, 1940.   E. E. HOFFMAN   2,213,026
GAUGE FOR BLENDING PAINTS, LACQUERS, ETC
Filed Dec. 7, 1939   2 Sheets-Sheet 2
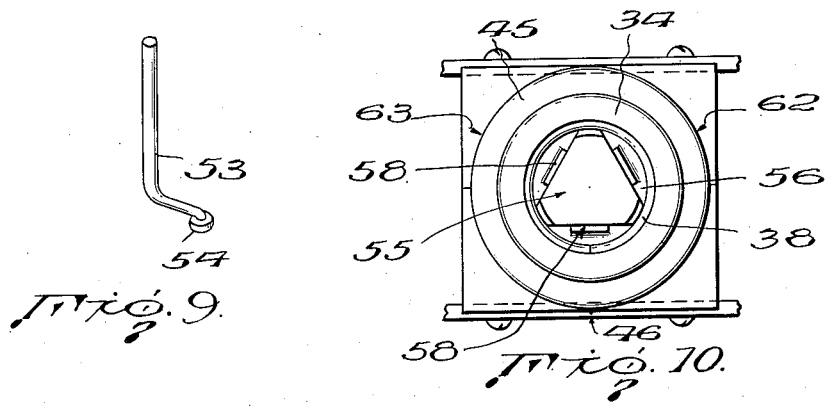
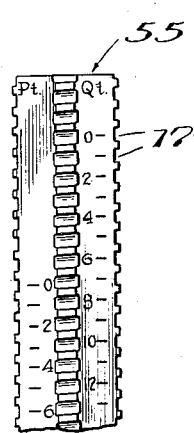
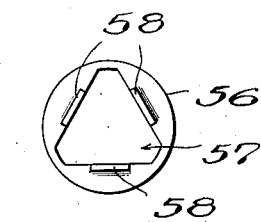
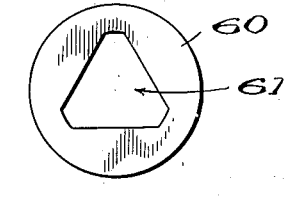
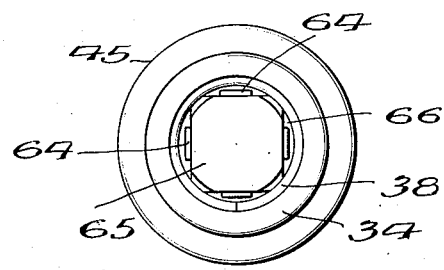
Inventor
E. E. Hoffman,
By K. P. McElroy
Attorney Patented Aug. 27, 1940

2,213,026

UNITED STATES PATENT OFFICE

2,213,026

GAUGE FOR BLENDING PAINTS, LACQUERS, ETC.

Earl E. Hoffman, Arlington, Va., assignor to National Paint, Varnish & Lacquer Association, Inc., Washington, D. C., a corporation of Delaware Application December 7, 1939, Serial No. 308,082

5 Claims. (Cl. 33—126.7)

This invention or discovery relates to gauges for blending paints, lacquers, etc.; and it comprises a gauge for blending coating compositions in a standard container, including an elongated, edge-threaded gauge rod advantageously graduated in aliquots of the container volume, a transverse support adapted to rest on the container, graduated nut means engaging the gauge rod and rotatably mounted on the support, and a contact member mounted on the gauge rod in adjustable extensible relation thereto, whereby the gauge can be accurately set to zero despite variations in the container shape; all as more fully hereinafter set forth and as claimed.

In painting shops, automobile finishing shops, etc., it is often necessary to produce a paint or lacquer of a certain color by mixing appropriate predetermined quantities of suitably colored constituents. There has recently come into use a system of selling to such establishments a rack of colored coating compositions (usually pigment pastes), as a unit, with a table showing the correct relative proportions of the several colors to be mixed for producing a given color, so that the painter can do his own blending. But correct proportionment of several liquids is difficult, especially when the quantity of coating composition to be prepared is small, as is often the case; for example where a single door of an automobile, after repair of some damage thereto, is to be repainted to match the body. If one of the components is of high tinctorial value, as is often the case (the colors being supplied in relatively concentrated form, as pigment pastes) a very small volumetric error therein may seriously affect the color of the mixed paint. In many cases, a quart is a convenient unit to prepare. Preparation of a quart of a pastel-pink paint may require blending of only ¼ fluid ounce of a red pigment paste with about a quart of white paint. A very small volumetric error here would markedly affect the color of the mixed paint. Ordinary measuring sticks have found some use but they are not sufficiently accurate. An ounce of liquid poured in a standard quart can raises the liquid level only about an eighth of an inch. It is hard to read the meniscus on the stick. Similar considerations apply to the use of graduated measuring vessels.

According to the present invention there is provided a blending gauge, which is primarily adapted for application to a standard paint can of a particular volume (quart, pint, etc.) and which is of accuracy sufficient for the blending of all sorts of coating compositions, to secure precisely the color desired. In the invention advantage is taken of the fact that paint can shapes, for pints, quarts, etc., are well standardized. Several features cooperate to provide the necessary accuracy. A vertical gauge rod is provided, adapted to extend into a can and graduated, most conveniently, in aliquot volumetric parts of the can size with which the gauge is to be mostly used. This rod is engaged by a graduated nut, which engages threads on the rod of such pitch that one turn of the nut moves the rod a distance corresponding to one aliquot. The nut affords a micrometric volume reading. The nut is mounted for rotation on a support which rests on the can. In order to insure accurate indication of contact between the rod and the paint in the can, there is provided a point on the lower end of the rod and the point is made adjustable in such manner that the gauge is readily set to zero with any can, despite the slight departures from standard dimensions exhibited by cans. The rod is advantageously of polyhedral form, with different scales on the various sides so arranged that the gauge is applicable to a plurality of standard cans; pint cans and quart cans for example. The gauge is, in practice, capable of such accuracy as to rule out any error in blending due to lack of precision of the measuring device. That is, if improper blending occurs, it must be attributed to some other cause than inaccuracy of the measuring instrument.

In the accompanying drawings there are shown more or less diagrammatically examples of specific embodiments of apparatus within the purview of the invention. In the drawings Fig. 1 is a view in front elevation of the principal embodiment of the gauge, shown in place on a paint container, Fig. 2 is a plan view of the gauge, Fig. 3 is a sectional view taken along line 3—3 of Fig. 1, Fig. 4 is a plan view of the lower guide ring, Fig. 5 is a view of the nut housing in side elevation, Figs. 6 and 7 are views in elevation of both sides of the gauge rod, Figs. 8 and 9 are views of modified forms of gauge rod pins, Fig. 10 is a view, corresponding to that of Fig. 2 of a modified gauge rod and nut assemblage employing a three-sided gauge rod, Fig. 11 is a fragmentary view in elevation of the upper portion of the gauge rod of Fig. 10, Figs. 12 and 13 are plan views of the upper and lower guide rings of the apparatus of Fig. 10, and Fig. 14 is a fragmentary plan view, corresponding to Fig. 10, of a modification of the invention utilizing a four-sided gauge rod.

Referring to the drawings, Fig. 1 shows the complete blending gauge applied to a standard quart paint can 15 in which paint is to be mixed. The gauge includes a gauge rod 16 (see also Figs. 6 and 7) advantageously threaded along one edge only at 17 to engage corresponding threads 18 in a nut 19. The nut is mounted for rotation in a housing 20, of approximately square exterior shape and slightly recessed on both sides at 21 to receive a pair of cross pieces 22 screwed to the housing at 23, for supporting the housing on the can. The housing, which is made in two parts held together by screws 25 (Fig. 5), has an inner bore 26 engaging the outside of the threaded portion of the nut, and an enlarged lower bore 27 defining a lip 28 which engages a flange 29 on the nut to prevent its upward movement. Bore 27 is grooved at 30 to receive a fixed discoid lower guide ring 31 (Fig. 4) slotted at 32 to guide the gauge rod. The nut has an enlarged upper portion 33 bearing on the top of the block and terminating in a knurled portion 34. The upper part of the nut is recessed at 35 to receive an upper guide ring 36, slotted at 37 to receive the gauge rod and retained to the nut, but free to rotate with respect thereto, by a spring ring 38 seated in the nut as shown. Guide ring 36 has two upwardly extending lips, 39 and 40, to serve as fiduciary means and facilitate reading the gauge rod.

The gauge rod is graduated on both sides as shown. One side (Fig. 6) is graduated directly in a scale of fluid ounces, and is for use with the standard quart can. The threads on the nut and on the gauge rod have such pitch that each revolution of the nut moves the rod one division, corresponding to one ounce. The nut carries a gauge ring 45, graduated in any convenient manner such as in thirty-seconds and sixty-fourths of an ounce as shown, and registering with a mark 46 on the nut housing. The other side of the rod (Fig. 7) is graduated to fit the standard pint can. These graduations are similarly spaced but their zero is located 7½ ounces down the scale with respect to the zero for the quart graduations (to take into account the difference in height of the standard quart and pint cans) and correspond to fractional parts (not ounces) of the pint can volume. Similarly, the nut graduations no longer measure fractions of an ounce, but merely fractional parts of the graduations of the rod scale. This is because the pint and quart cans differ in diameter as well as in height. A mark (not shown) similar to mark 46 is provided on the opposite side of the housing, for use when the pint scale is being read.

The lower end of the gauge rod carries an acorn-pointed pin 48, frictionally retained in a bore 49 slotted at 50 to give spring action and terminating in an enlarged eye 51. The pin makes a snug sliding fit with the rod.

In use, pin 48 is first pushed all the way down with the aid of a pencil or tool inserted in the eye. The gauge is then set to zero on the gauge rod and on the gauge ring. The gauge is put on an empty can and pressed down; pin 48 engages the bottom of the can and is forced upwardly somewhat. The gauge is now ready for use. It is set for the quantity of the first constituent to be put in the can, and this constituent is poured in until the surface of the liquid just touches the point of the pin. Accuracy is assured, as the distortion of the liquid surface as it just makes contact with the pin is quite marked. Then the end of the pin is wiped off, and the gauge is set for the next constituent.

A bent form of pin, shown at 52 in Fig. 8, is sometimes convenient, and can readily be substituted for the pin shown in Fig. 1 when desired. Fig. 9 shows another form of pin 53 having a discoid contact portion 54, which has the advantage of giving a very easily visible indication of contact with the liquid in the can. When the discoid portion meets the liquid surface the surface is distorted in an unmistakable manner.

The gauge of Figs. 1 to 7 bears two scales, which is enough to meet most requirements, but if more scales are desired the gauge rod can be provided with more than two sides, with a scale on each. Figs. 10 to 13 illustrate a modification employing a triangular gauge rod 55, with three scales (two of which appear in Fig. 11) and teeth 17 along three edges. The rod is in the form of a threaded round rod with three flat faces planed off thereof and indeed is most conveniently manufactured in this manner. An upper guide ring 56 is provided, having the same function as ring 36 of Fig. 2 but provided with a triangular aperture 57 (Fig. 12) for reception of the gauge rod, and having three lips 58 to facilitate reading of the divisions on the rod. A lower guide ring 60, apertured as shown at 61 (Fig. 13), takes the place of ring 31 of Fig. 4. Otherwise, the three-sided gauge is closely similar to the gauge of Figs. 1 to 7. Three index marks, 46 (cf. Fig. 1), 62 and 63 are provided on the nut housing, for reading the nut graduations for each of the three scales. The scales on the rod have their zero points at appropriate distances from the top of the rod, as shown. The pint scale begins 7⅓ divisions down from the zero of the quart scale, instead of 7½ divisions down as in the apparatus of Fig. 1.

Fig. 14 shows how a four sided gauge rod may be employed. The rod 65 is guided in an upper guide ring 66 having lips 64 for reading. A lower guide ring (not shown) with a square aperture is provided in the assemblage of Fig. 4. The indices and scales in the apparatus of Fig. 14 are arranged similarly to the corresponding elements in the apparatus of Figs. 1 to 13.

The gauge is embodied in any suitable material, metallic or non-metallic. It has been found convenient to make the housing, nut and guide rings of bronze, the legs of steel, the gauge rod and its contact point of stainless steel, and the gage ring of aluminum. The housing nut and legs are advantageously chromium-plated.

The gauge can be used for blending liquids in any sort of container provided only that the container is of uniform cross section along its height. In non-standard containers the gauge graduations represent merely parts by volume; not ounces and fractions thereof. The gauge can of course be used for blending other liquids besides pigment pastes, paints and lacquers.

What I claim is:

1. A gauge for blending liquid coating compositions in a container, comprising an elongated, threaded, graduated gauge rod, a transverse support, graduated nut means rotatably mounted on the support and engaging the gauge rod and a contact member mounted on the gauge rod in adjustable extensible relation thereto, whereby the gauge can be set to zero despite variations in the container height.

2. The gauge of claim 1 wherein the gauge rod is graduated in aliquot volumetric parts of a standard container and the thread pitch is such that one revolution of the nut moves the rod a distance corresponding to one such part.

3. A gauge for blending liquid coating compositions in a container comprising an elongated, threaded polyhedral gauge rod bearing graduations on a plurality of its sides, a transverse support, graduated nut means engaging the threads of the gauge rod, means for securing the nut to the support while permitting free rotation thereof, and a contact pin mounted on the lower end of the gauge rod in vertically adjustable relation thereto, for setting the gauge to zero.

4. A gauge for blending fluent coating compositions in a container, comprising an elongated gauge rod of polyhedral form with a plurality of scales on the sides thereof and threaded along the intervening edges, a transverse support, graduated nut means rotatably mounted on the support and engaging the threads of the gauge rod, a rod guide member engaging the gauge rod, in fixed relation with the support and arranged to restrain rotation of the gauge rod while permitting vertical movement thereof and a second rod guide member in the nut means engaging the gauge rod at a point spaced from the point of engagement of the fixed rod guide member.

5. A gauge for blending fluent coating compositions in a container, comprising a graduated gauge rod having threads extending over a portion only of its circumference, a graduated nut encircling the rod and having threads engaging the threads on the rod, a bored transverse support member for the nut arranged to permit rotation of the nut, a lower guide member in said support member for guiding th egauge rod, an upper guide member in the nut for guiding the gauge rod, and fiduciary means provided on the upper guide member for reading the gauge rod graduations.

E. E. HOFFMAN.